Sept. 3, 1968  R. L. KNOWLTON  3,399,920
COLLAPSIBLE CAMPERS
Filed Aug. 3, 1966  2 Sheets-Sheet 1
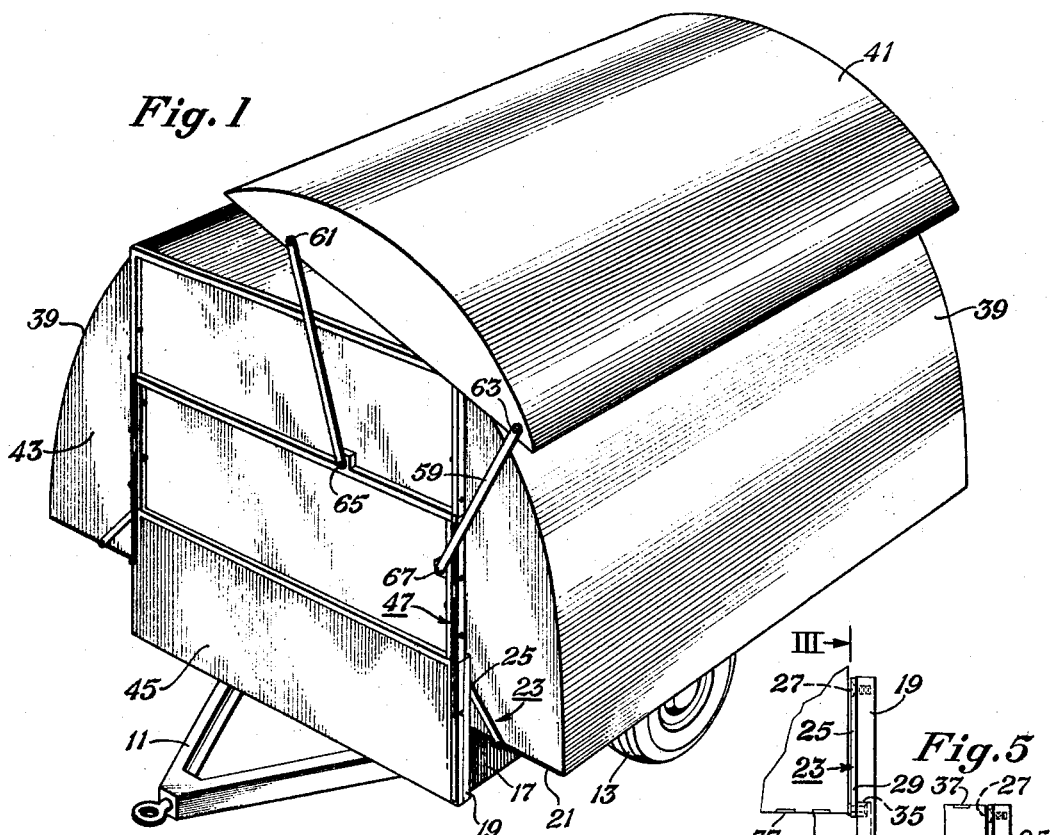
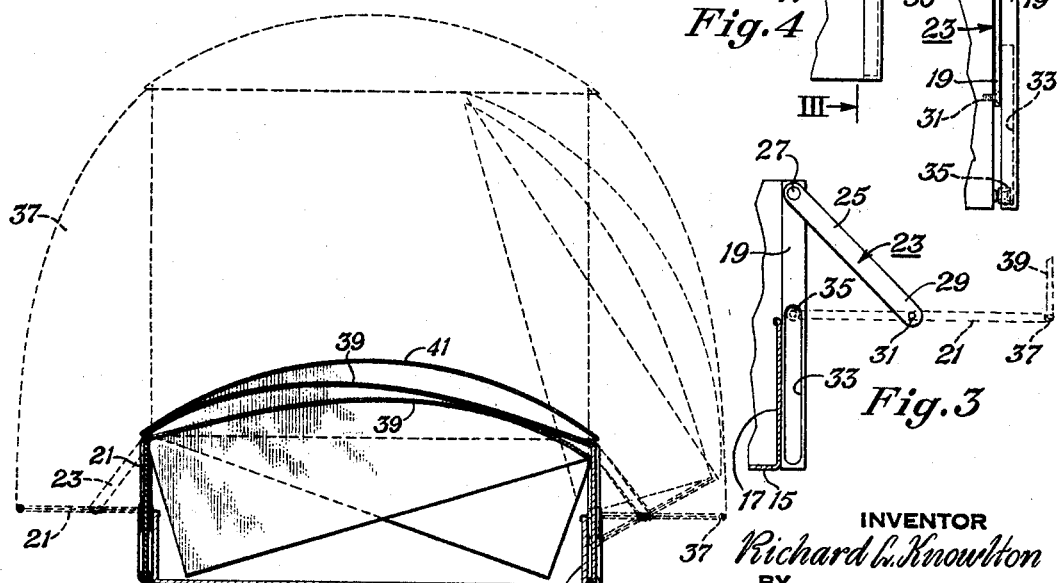
INVENTOR
Richard L. Knowlton
BY
Wofford & Felsman
ATTORNEYS

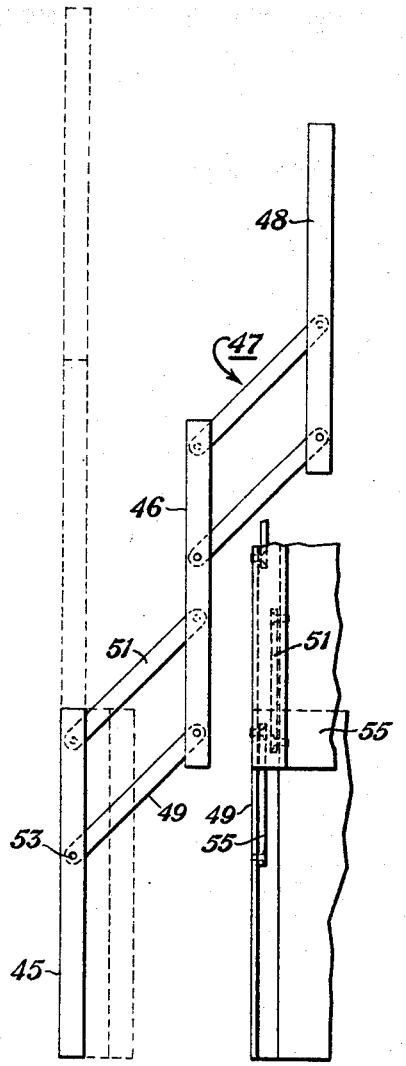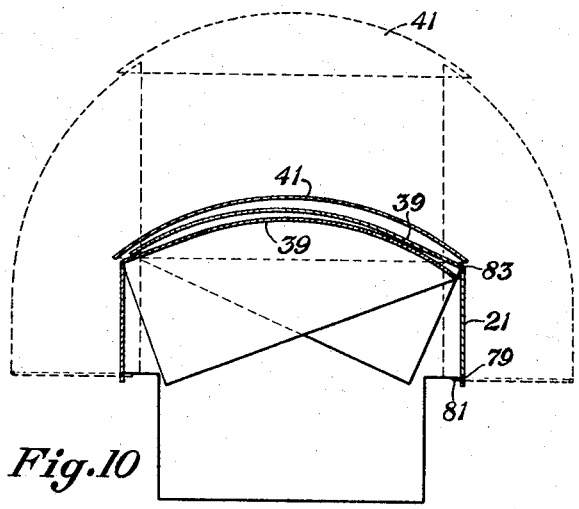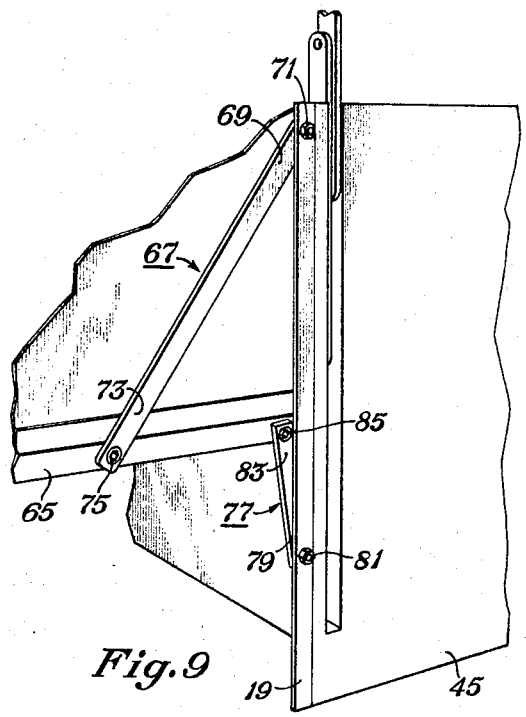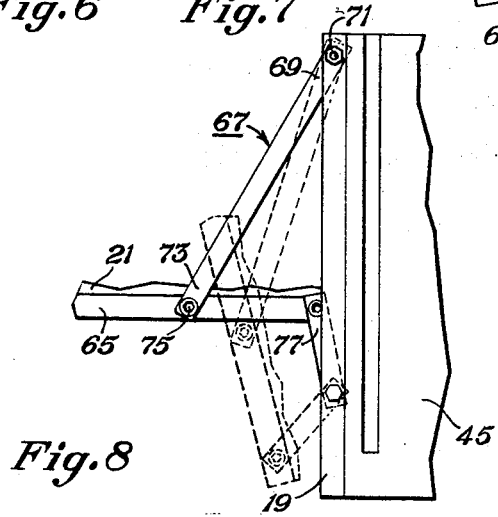

United States Patent Office 3,399,920
Patented Sept. 3, 1968

3,399,920
COLLAPSIBLE CAMPERS
Richard L. Knowlton, 4629 Cummings Drive E.,
Fort Worth, Tex. 76118
Filed Aug. 3, 1966, Ser. No. 569,988
9 Claims. (Cl. 296—27)

My invention relates in general to camping equipment, and in particular improvements in campers of the collapsible type which are adapted to be portable and thus conveniently transferred between selected locations such as home and camp site.

Previously, campers have been developed which may be collapsed to a low, narrow width configuration for convenient transportation, and which may be expanded upon reaching the camp site to provide relatively spacious quarters. Collapsible campers with which I am familiar have a number of disadvantages, one of which results from the frequently used pliable material such as canvas that is used to enable collapsing and expansion of the framework of the camper. Such fabrics may deteriorate in a relatively short period of time; may be torn easily if not handled cautiously; and are sometimes difficult to clean property. There are some collapsible campers constructed of rigid panels, but the difficulty has been in providing satisfactory interrelated panel construction such that a low profile, narrow camper is provided when collapsed and yet a spacious camper provided when expanded. Some of the rigid panel campers with which I am familiar have interior dimensions either in the collapsed condition or in the expanded position, or in both, which are too cramped; other such campers have rigid panel construction and linkage means that are too complex or difficult to manipulate.

It is therefore the general object of my invention to provide an improved collapsible camper having rigid panel construction.

Another object of my invention is to provide an improved collapsible camper with rigid panels, some of which expand to increase the volume inside the camper in a manner which minimizes the number of folded joints or hinges but which provides large storage area inside the camper when collapsed or expanded.

Another object of my invention is to provide a collapsible camper with rigid side wall and a rigid roof panel arranged so that the roof panel covers the entire width and length of the collapsed camper and nests with the side walls of the camper in a manner to maximize storage area when the camper is either collapsed or expanded.

Another object of my invention is to provide in a collapsible camper, rigid end wall panels which collapse and expand in a manner to minimize loss of space when the camper is collapsed.

Another object of my invention is to provide improved support means that enable convenient movement of the side extension panels on a collapsible camper from horizontal to vertical positions.

Another object of my invention is to provide an improved form and relationship betwen the side wall, roof and side extension panels of a collapsible camper to increase the available space therein.

These and other objects are effected by my invention as will be apparent from the following description taken in accordance with the accompanying drawings, forming a part of this application, in which:

FIG. 1 is a perspective view of a collapsible camper embodying principles of my invention;

FIG. 2 is a cross sectional view of the collapsible camper of FIG. 1 and is provided to illustrate the manner in which the side extension, side wall, and roof panels cooperate throughout the various collapsed and expanded positions;

FIG. 3 is a fragmentary cross sectional view of support means for the lateral side extension panels shown in FIGS. 1 and 2 and is taken along the lines III—III of FIG. 4;

FIG. 4 is a fragmentary side elevational view of the support means of FIG. 3, showing a side extension panel in the expanded, horizontal position;

FIG. 5 is another fragmentary side elevational view of the support means of FIG. 3, showing a side extension panel in the collapsed, vertical position;

FIG. 6 is a side elevational view of rigid end panels and means by which they are adapted to move from the expanded to the collapsed positions;

FIG. 7 is a fragmentary front elevational view of the end panels of FIG. 6;

FIG. 8 is a side elevational view of a modified form of support means that facilitates movement of the side extension panels between the expanded and collapsed positions;

FIG. 9 is a fragmentary perspective view showing the apparatus of FIG. 8; and

FIG. 10 is a transverse cross sectional view of a modified form of my collapsible camper.

The numeral 11 in FIG. 1 designates a horizontally extending frame member constructed of beams and arranged in the form of a trailer supported by wheels 13. The frame member has a floor 15, as shown in FIG. 2, which is preferably rectangular in configuration. In this instance a short apron 17 extends upwardly from the floor along the sides of the camper and vertical brace means 19 extend from each corner. Extending between a respective pair of longitudinally spaced apart vertical brace means 19 is a rigid side extension panel 21, which is rotatably and slidably carried supported on and extends along the length of each lateral edge or side of the frame and the apron 17. These side extension panels may be rotated inwardly with respect to the longitudinal axis of the floor 15 of the camper to a vertical position (see FIG. 2) when the camper is collapsed, and outwardly to a horizontal position (see FIG. 1) when the camper is expanded.

A preferred means for supporting the rigid side extension panels 21 and for permitting their rotatable and slidable movement between the above described horizontal and vertical positions includes a pivotable bracket 23 (see FIGS. 3–5) which has one end 25 rotatably secured to the vertical brace means 19 by a pin fastener 27 at a location above the rigid side extension panel 21 when in its horizontal position. The other end 29 of the pivotable bracket 23 is rotatably secured by another pin fastener 31 to the edge of the rigid side extension panel preferably but not necessarily at the approximate mid-region thereof, as shown in FIG. 3. The vertical brace means 19 has a vertically slotted portion 33 extending along the length of its inwardly facing side. A follower 35 is connected with and extends longitudinally from the inner region of said side extension panel 21 into the vertically slotted portion 33 of the vertical brace means 19. They are support means of the above type on each end of each side extension panel 21. Thus, the side extension panels on each side of the camper may be moved between the horizontal, laterally extended position shown in FIG. 1 and the vertical, collapsed position shown in FIG. 2.

A rigid side wall panel 39 is secured by suitable hinge means 37 (see especially FIGS. 3 through 5) to the longitudinally extending outer edge of each side extension panel 21. These side wall panels are adapted to move to a collapsed substantially horizontal position (see especially FIG. 2) when the associated side extension panel 21 is in the above described vertical position, and to move to a substantially vertical position when the associated side extension panel is moved to the above described horizontal position. The upper portions of the side wall panels converge toward each other in arcuate fashion when the camper is expanded and thus the transverse distance between the longitudinally extending edges of these outer regions is substantially the same as the width across the upper edges of the side extension panels when in the collapsed vertical position.

Extending across the top of the camper is a rigid roof panel 41 which has a generally arcuate configuration such that it will nest with the upper of said side wall panels when the camper is collapsed (see especially FIG. 2).

Closure means are carried by the frame and the camper for sealing the end portions thereof. In this instance the closure means include end sections 43 that are secured to each end of each rigid side wall panel 39, and a plurality of rigid end panels 45, 46 and 48 which are interconnected with the linkage means 47 that move the end panels to a side-by-side storage position at the end of the camper when collapsed.

A preferred construction of a satisfactory linkage means is shown in FIGS. 6 and 7. Each end panel is connected to an end adjacent end panel by two sets of parallel bars that are spaced apart laterally from each other and preferably disposed along the outer edge of the end panels as shown in FIG. 1. Each set of parallel bars has two aligned bars 49, 51, the ends of which are connected by the pin fasteners 53 to a respective side panel in a slotted portion 55 thereof ass hown in FIG. 7. The aligned, parallel bars 49, 51 of FIGS. 6 and 7 are spaced apart laterally from each other. The rigid end panels have a downwardly extending portion 56 which overlaps the upper edge of the adjacent end panel. As many end panels may be secured to each other as needed and may be readily moved downward from the extended position shown in phantom in FIG. 6 and nested upon each other as shown in phantom in the lower portion of FIG. 6.

The rigid roof panel 51 is movable from its uppermost position to the collapsed position in this instance with the aid of movable support columns 59. A pair of such support columns is rotatably secured to the outer edge of each end of the rigid roof panel by a pair of spaced apart pin fasteners 61, 63 (as shown in FIG. 1). The other end of support column 51 is rotatably secured by a pin fastener to a region of one of the rigid end panels, as indicated by the numeral 65, and the other end of support column 63 is secured to another region of another end panel, as indicated by the numeral 67. Thus, the roof panel 41 may be moved from its upper expanded position to the collapsed position by rotating it with the assistance of the support columns 59, 61.

In operation and referring initially to FIG. 1, the camper is shown as being in its extended position but with the roof panel 41 being rotated slightly clockwise. The roof panel, if rotated farther in the clockwise direction, will eventually nest against the rigid side wall panel on the right as viewed in FIG. 1. After being properly nested in this manner the support columns 59 may be removed, or alternatively, are used to secure the rigid roof panel 41 to the side wall panel with which it is nested. Then the rigid end panels 45, 46 and 48 may be moved downward into their collapsed position as shown in FIG. 6. The rigid side wall panel opposite the one upon which the roof panel is nested is rotated clockwise and at the same time force applied to its associated side extension panel 21 until it assumes the vertical position shown in FIG. 2 and the side wall panel is then moved to the position shown in FIG. 2. Next, the side wall panel upon which the roof panel is nested is rotated counterclockwise as viewed in FIGS. 1 and 2 and force applied to its associated side extension panel 21 until it assumes the collapsed position shown in FIG. 2. Thus, both side wall panels and the roof panel are nested and the end panels positioned such that a very low profile traveling contour is established.

An alternate form of rotatable and slidable support means for the side extension panels and side walls is shown in FIGS. 8 and 9. The vertical brace means 19 which is supported by the frame member 11 (not shown) is attached to one vertical edge of the lowermost rigid or stationary end panel 45. Each side extension panel 21 in this instance has a support beam 65 which extends along the edge of each end thereof. A first pivotable bracket 67 has one end 69 rotatably secured to the vertical brace means 19 by a conventional fastener 71 at a region above the side extension panel when in the horizontal position. The other end 73 of the first pivotable bracket is rotatably secured to an approximate mid-region of the support beam extending along the edge of side extension panel by a conventional fastener 75. A second pivotable bracket 77 has one end 79 secured to the vertical brace means 19 by a conventional fastener 81 and the other end 83 rotatably secured by a conventional fastener 85 to an inward portion of the support beam 65.

To move a side extension panel from the horizontal, expanded position shown in FIG. 9 to the vertical, collapsed position shown generally in FIG. 2, a lateral and outward force is applied to the side extension panel or its support beams 65 to rotate the second pivotable bracket 77 in a counterclockwise direction (as viewed in FIGS. 8 and 9) while rotating the first pivotable bracket 67 in a clockwise direction. Continued such movement urges the side extension panel and its support beams 65 toward the vertical position, as is indicated in phantom in FIG. 8.

The embodiment of my invention shown principally in FIGS. 1 and 2 and which utilizes the linkages shown in FIGS. 3 through 5 or the linkages shown in FIGS. 8 and 9 utilizes side extension panels which have their outer lateral edges pivotally or rotatably secured to the outer and lower longitudinally extending edge of the rigid side wall panels, and to the frame in both "rotatable and slidable" manners. "Slidable" means downward movement relative to the frame, whether such be purely sliding like the movement of follower 35 of FIGS. 4, 5 and 6 or movement in an arc like the fastener 85 of FIGS. 8 and 9. In FIG. 10 is shown a modified form of my camper which may be conveniently installed on pickup truck beds, for example, and which has the side extension panel 21 rotatably secured by hinges 79 or other suitable means to a longitudinally extending support 81. Another hinge means 83 secures the longitudinally extending upper edge of the rigid side extension panel to the lower edge of the rigid side wall panel 39. The rigid roof panel 41 is adapted to nest over the rigid side wall panels when collapsed, as shown in FIG. 10, and is movable between the expanded and collapsed positions in a manner somewhat similar to that of the camper shown in FIGS. 1 and 2.

Thus, the camper shown in FIG. 10 utilizes side extension panels which pivot about a fixed point on the edge of the camper between a horizontal and a vertical position, whereas in those forms of my camper previously described, the rigid side extension panels have a pivot point which is movable from a downward stored position when the side extension panel is in its vertical position to an upward position when the camper is expanded.

While I have shown my invention in only a few of its forms, it should be apparent to those skilled in the art that it is not so limited but is susceptible to various changes and modifications without departing from the spirit thereof.

I claim:
1. A collapsible camper comprising:
   a horizontal frame;
   a rigid side extension panel rotatably supported by and extending along the length of each lateral edge region of said frame and being movable inwardly to a vertical position when the camper is collapsed and outwardly to a horizontal, laterally extending position when the camper is expanded;

a rigid side wall panel rotatably secured to the longitudinally extending outer edge of each side extension panel to move to an extended substantially vertical position when the associated side extension panel is in said horizontal position, and to move to a collapsed substantially horizontal position when the associated side extension panel is in said vertical position, with said side wall panels being nested when collapsed such that their outer edges extend substantially across the collapsed width of said camper, and with the upper portions of said side wall panels converging toward each other when the camper is expanded;

a rigid roof panel pivotally linked to the frame and having a configuration that nests with the upper of said side wall panels, when collapsed, having a width to extend across the space defined by the vertically disposed side extension panels when the camper is collapsed, and having a width to extend across the converging portions of said side wall panels when expanded; and closure means carried by said frame for sealing the end portions of said camper.

2. The camper defined by claim 1 wherein the said closure means comprises a plurality of rigid end panels which are interconnected with linkage means for moving them to a side-by-side storage position at the ends of the camper when collapsed.

3. The camper defined by claim 2 wherein each said end panel is connected to the adjacent end panel by two sets of parallel bars that are rotatably secured to the panels.

4. The camper defined by claim 1 which further comprises:

vertical brace means secured to the respective corners of said frame;

a first pivotable bracket with one end rotatably secured to the vertical brace means above said side extension panel when in said horizontal position, and the other end rotatably secured to an approximate mid-region of said side extension panels;

a second pivotable bracket with one end rotatably secured to the vertical brace means below said side extension panel when in said horizontal position, and the other end rotatably secured to an inward region of said side extension panel.

5. The camper defined by claim 1 which further includes vertical brace means secured to said frame along the inward edge of said side extension panel; a pivotable bracket with one end rotatably secured to said vertical brace means and its other end secured to the approximate mid-region of said side extension panel; said vertical brace means having a vertically slotted portion; and a follower extending from the inward region of said side extension panel and into said slotted portion.

6. A collapsible camper comprising:

a horizontal frame;

a rigid side extension panel rotatably and slidably supported by and extending along the length of each lateral edge region of said frame; hinge means connecting an inward edge of each rigid side extension panel with one of said edge regions of said frame; support means carried by said frame and secured to each said side extension panel to position each said panel in a selected horizontal or a vertical position;

a rigid side wall panel; hinge means rotatably secured to the outer lateral edge of each side extension panel and the lower edge of each side wall panel; said side wall panels including support surfaces to position them vertically when the camper is expanded, with said side wall panels being nested when collapsed to extend substantially across the collapsed width of said camper, and with the upper portions of said side wall panels being convex viewed from the camper exterior to converge toward each other when the camper is expanded;

a rigid roof panel pivotally linked to the frame and substantially nesting with the upper of said side wall panels, when collapsed, having a width to extend across the space defined by the vertically disposed side extension panels when the camper is collapsed, and having a width to extend across the converging portions of said side wall panels when expanded; and closure means carried by said frame for sealing the end portions of said camper.

7. A collapsible camper comprising:

a floored frame;

side extension panels rotatably and slidably carried on respective lateral sides of said frame; a pair of pivotable brackets having ends secured to the approximate mid-regions of forward and rearward edges of each side extension panel and having their other ends rotatably secured to a portion of the frame above the side extension panel; whereby said side extension panels may move from horizontal to vertical, low profile positions;

rigid side walls secured to outer lateral edges of said side extension panels for movement between vertical and horizontal positions; said side wall panels including support surfaces to position them vertically when the camper is expanded, a rigid roof panel pivotally linked to the frame and having a configuration to nest with the exterior surface of said rigid side wall panel when in their horizontal positions; and closure means carried by said camper for closing the end portions of said camper.

8. A collapsible camper comprising:

a floored frame;

side extension panels rotatably and slidably carried on respective lateral edges of said frame;

a pair of pivotal brackets having ends secured to forward and rearward edges of each side extension panel and having their other ends rotatably secured to a portion of the frame above said side extension panels, whereby said side extension panels may move from horizontal to vertical, low profile positions;

rigid side walls secured to outer lateral edges of said side extension panels for movement between vertical and horizontal positions;

said side wall panels including support means to position them vertically when the camper is expanded;

closure means carried by said camper for closing the end portions of said camper; and a rigid roof panel carried by selected ones of the above panels and having a configuration to nest with the exterior surface of said rigid side wall panels when in their horizontal positions, said roof panel being supported by the end closure means and the side wall panels when expanded.

9. A collapsible camper comprising:

a horizontal frame;

a rigid side extension panel rotatably supported by and extending along the length of each lateral edge region of said frame and being movable inwardly to a vertical position when the camper is collapsed and outwardly to a horizontal, laterally extending position when the camper is expanded;

a rigid side wall panel rotatably secured to the longitudinally extending outer edge of each side extension panel to move to an extended substantially vertical position when the associated side extension panel is in said vertical position, with said side wall panels being nested when collapsed such that their outer edges extend substantially across the collapsed width of said camper, and with the upper portions of said side wall panels converging toward each other when the camper is expanded;

closure means carried by said frame for sealing the end portions of said camper;

a rigid roof panel with a configuration that nests with the upper of said side wall panels, carried by selected ones of the above camper components when collapsed, said roof panel having a width to extend substantially across the space defined by the vertically disposed side extension panels when the camper is collapsed, and having a width to extend across the converging portions of said side wall panels when expanded.

References Cited

UNITED STATES PATENTS 3,083,047  3/1963  Babbel _____ 296—23.2

FOREIGN PATENTS 1,266,524  6/1961  France.
601,157  4/1948  England.

PHILIP GOODMAN, *Primary Examiner.*